Aug. 22, 1961

F. SALTZ ET AL 2,996,803

MATHEMATICAL INSTRUMENT

Filed Oct. 31, 1958

FRED SALTZ
HENRY JOSEPH LOMBARD, JR.
*INVENTORS*

United States Patent Office 2,996,803
Patented Aug. 22, 1961

2,996,803
MATHEMATICAL INSTRUMENT
Fred Saltz, 6 Harrison St., Binghamton, N.Y., and Henry
J. Lombard, Jr., 16 N. Broadway, White Plains, N.Y.
Filed Oct. 31, 1958, Ser. No. 770,950
1 Claim. (Cl. 33—1)

This invention relates to mathematical instruments, and particularly to an improved type of mechanical integrator. More particularly, this invention relates to an improved planimeter, arranged so that not only the area of irregular plane areas may be determined, but also other integral functions involving areas, such as center of gravity, area moment of inertia and polar moment of inertia may be determined quickly and accurately.

It is a primary object of the invention to provide an economical, simple and accurate mechanical integrator having a minimum of moving parts.

Another object of this invention is to provide an integrator which may be employed not only to find the areas of irregular shaped plane areas, but also centers of gravity, area moments of inertia and polar moments of inertia.

A further object of the invention is to provide an integrator of the type described in which a plurality of changeable scales may be used, depending upon the type of calculations and the scale factors involved.

These and other objects of the invention and advantages thereof will become apparent from the following description and the accompanying drawings in which.

Similar reference characters refer to similar parts in each of the several views.

Briefly described, the invention comprises a beam which is provided with indicia thereon, and equipped with a movable pivot or axis follower point, which can be positioned at different predetermined indicia or scale factor locations along the beam. At one end of the beam there is provided a tracer wheel, mounted to rotate about an axis collinear with the axis of the beam. An indicator or index is rigidly attached to the beam for the purpose of reading indicia on the tracer wheel. In a first embodiment, one permanent scale is provided on the beam, and a center pointer only is used, for obtaining polar moments of inertia. In a second embodiment, a plurality of removable scales are provided which may be placed on the beam, and by using a center pointer or an axis follower as necessary, any of the four types of integration may be performed.

Figure 1:
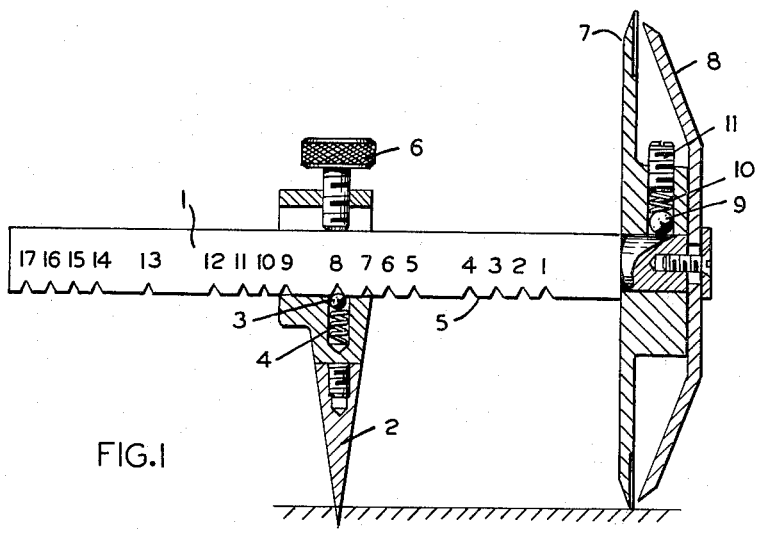
FIG. 1 is a diagrammatic illustration in elevation of one embodiment of the invention.
Figure 2:
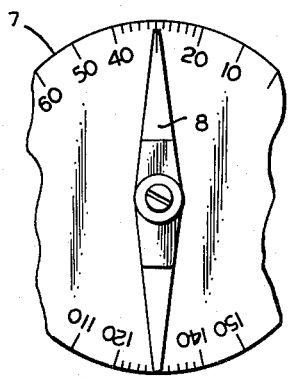
FIG. 2 is a diagrammatic illustration, in side elevation, of an indicator which is applicable to the embodiment of FIG. 1.
Figure 3:
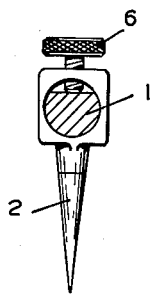
FIG. 3 is a diagrammatic illustration, in side elevation, of the type of center pointer shown in FIG. 1.

Referring to FIGS. 1, 2 and 3 of the drawings, there is shown a first embodiment of the invention arranged to perform only the integration for polar moments of inertia.

The device comprises a beam 1, and a center pointer 2 which is set at various predetermined points along the beam. These predetermined points along the beam at which the center pointer is located is determined by notches 5 cut on the underside of the beam. The center pointer takes the correct position on the beam because it is detented by a ball 3, backed by a spring 4. To insure that no slip takes place after the center pointer has been located, it is securely locked by means of the finger screw 6. One end of the beam carries a tracer wheel 7 and an indicator 8. The tracer wheel is free to rotate on the end of the beam, but is provided with a frictional drag by means of a ball 9 and a spring 10. The drag is to prevent over-running of the tracer wheel during operation and the amount of drag can be adjusted by means of a screw 11. Suitable indicia are provided on the beam and around the periphery of wheel 7.

To obtain the polar moment of inertia with respect to a pole 0, of some section enclosed by an area, the area is scanned by rolling the tracer wheel 7 across the enclosed area in the following manner: The center pointer 2 is set at the pole 0 from which the integration is to be reckoned. The beam 1 is positioned with notch 1 over the pole (starting may begin with any other notch depending on the configuration of the area). The tracer wheel 7 is set to read zero on the indicator 8. Starting at one boundary of the enclosed area, the tracer wheel 7 is rolled without slip to the other boundary. It is then lifted off the paper, the beam advanced to the adjacent higher order notch and the process repeated, rolling in the same direction from one boundary to the other.

The notches locating the tracer wheel from the pole 0 are made up in sets. Each set has its own scale factor, and after scanning with a set of notches is completed, a reading is taken from the tracer wheel 7. This reading is multiplied by the appropriate scale factor. After the entire area is scanned the several readings are added to give the polar moment of inertia.

Figure 5:
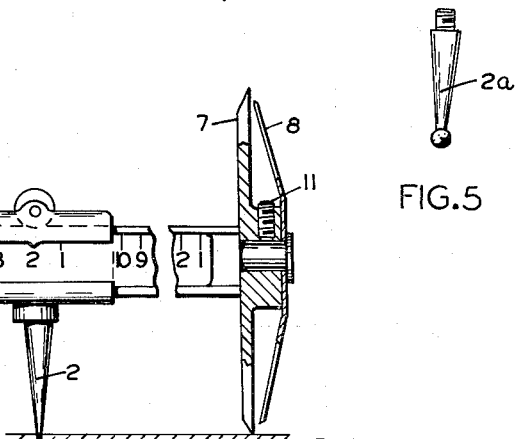
FIG. 5 is a diagrammatic view of an axis follower which may be used with the embodiment of FIG. 4.
Figure 4:
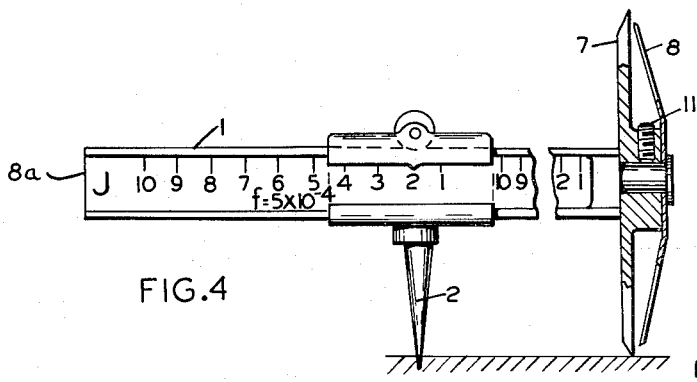
FIG. 4 is a diagrammatic view in elevation of a second embodiment of the invention.

The device shown in FIG. 4 can be used to evaluate the integration for (1) polar moments of inertia, (2) area moments of inertia, (3) center of gravity, and (4) area, each of which is performed using the same beam, tracer wheel and indicator, but by inserting into the beam the proper one of a plurality of removable scales. These scales are predetermined for calculating the polar moment of inertia, the area moment of inertia, the center of gravity and area. For polar moments of inertia, the center pointer 2 is fixed at the pole 0, while for measuring area moments of inertia, center of gravity or area, the axis follower 2a, FIG. 5, is used instead.

To determine the polar moment of inertia using the device shown in FIG. 4, the proper scale is inserted in the beam 1, and the operation proceeds as previously described.

To determine the area moment, center of gravity or area of a section, the proper scale is inserted. The center pointer 2 is removed and in its place the axis follower 2a, FIG. 5, is used. The section is then scanned by rolling the tracer wheel 7 across the section from one boundary to the next keeping the axis follower 2a on the prescribed axis. On the first scan the beam 1 is positioned with the axis follower 2a over the first graduation of the scale (starting may begin with any other graduation, depending upon the configuration of the section and its position relative to the axis). The tracer wheel is set to read zero on the indicator 8. Starting at one boundary of the enclosed area, the tracer wheel is rolled without slip to the other boundary point while the axis follower moves along the axis. The tracer wheel is then lifted off the paper and the beam advanced to the adjacent higher order graduation on the scale. The process is repeated rolling in the same direction from one boundary to the next until the entire area has been scanned.

The graduations on the scale are made up in sets. Each set has its own scale factor and after scanning with a set a reading is taken from the tracer wheel 7. The reading is then multiplied by the appropriate scale factor as marked on the scale. After the entire area has been scanned the several readings are added together.

In the case of polar moments of inertia the scale factors are such that total reading gives the polar moment of inertia of a steel section one unit in thickness. For sections of other than unit thickness or of material other than steel, the total reading is multiplied by an appropriate factor. In the event the section is drawn to a scale other than 1 to 1, the total reading is corrected by multiplication by a drawing scale factor.

In the case of area moments of inertia or polar moments of inertia the total reading gives the area moment of inertia with respect to a pole 0 on an axis XX. If the moment of inertia is required with respect to some other parallel axis it is readily obtained by means of the parallel axis theorem of mechanics.

In the case of center of gravity measurements, the total reading represents the product of the coordinate of the center of gravity $\overline{X}$ and the area A. To obtain $\overline{X}$ the total reading is divided by the area. To obtain the coordinates of the center of gravity, two measurements are made using any pair of the axes XX and YY. The first reading locates $\overline{X}$ and the second $\overline{Y}$, the distances from the axes.

In the case of finding the area the total reading gives the area directly, independent of the axis used.

The device, in measuring polar moments of inertia, evaluates integrals by dividing the enclosed area into adjacent concentric bands. The tracer wheel is positioned so that it rolls along the mean path of a band. The bands are determined by calculations so that the wheel when rolling along a mean path turns through an angle proportional to the moment of inertia of the band (or the value of the integral from the band). The linear relation between the angle of rotation and moment of inertia is constant for a set of scale divisions. For the next set of divisions, the relationship is again linear but the constant of proportionality is changed and a new scale factor is provided for the next set of divisions.

The device in measuring area moments of inertia (or center of gravity or area) evaluates the appropriate integrals by dividing the enclosed area into adjacent parallel strips. The tracer wheel is positioned so that it rolls along the mean path of a strip. The strips are determined by calculation so that the wheel when rolling along a mean path turns through an angle proportional to the area moment of inertia (or center of gravity or area) of the strip, i.e., evaluates the integral for the strip. The linear relation between the angle of rotation and area moment of inertia (or center of gravity or area) is constant for a set of scale divisions. For the next set of divisions, the relationship is again linear, but the constant of proportionality is changed and a new scale factor provided for the next set of divisions.

From the foregoing it will be apparent that the present invention provides a simple, economical and easily usable instrument with which various integrals may be obtained, necessary in kinematics and machine design.

Although there have been shown and described only two embodiments of the invention, it will be apparent to those skilled in the art that various changes and modifications may be made therein, within the scope of the appended claim, without departing from the spirit and scope of the invention.

Having thus described the invention, what is claimed is:

A mechanical integrating instrument, comprising, in combination, a beam, a centering pivot mounted on said beam for sliding motion along said beam, retaining means for said centering pivot for frictionally engaging said beam to maintain said pivot at any selected location along said beam, a tracer wheel rotatably mounted on a reduced coaxial portion of the beam at one end of said beam for rotatiton about an axis collinear with the axis of said beam, drag means mounted on said tracer wheel for exerting a controlled frictional drag between said wheel and said beam, said tracer wheel having calibrated indicia marks on the periphery thereof, a marker fixedly mounted at the end of the reduced portion of said beam to provide a reference point for reading the indicia marks on said tracer wheel, said beam having a longitudinal recessed surface along one aspect thereof, and a plurality of differently calibrated beam scale elements arranged to be inserted in said recessed surface, said surface and said scale elements being proportioned so that the elements are retained in the recessed surface solely by frictional engagement between said scale elements and said recessed surface, said beam scale elements being calibrated for a corresponding plurality of different integrating operations.

References Cited in the file of this patent

UNITED STATES PATENTS

| | | |
|---|---|---|
| 37,002 | Lawrence | Nov. 25, 1862 |
| 889,225 | Haas | June 2, 1908 |
| 1,142,423 | Hawthorne | June 8, 1915 |
| 2,108,251 | Clark | Feb. 15, 1938 |
| 2,209,250 | Manthey | July 23, 1940 |
| 2,863,220 | Staples | Dec. 9, 1958 |

FOREIGN PATENTS

| | | |
|---|---|---|
| 386,120 | France | Apr. 6, 1908 |
| 425,048 | France | Mar. 28, 1911 |
| 523,029 | France | Apr. 13, 1921 |
| 868,790 | Germany | Feb. 26, 1953 |